S. STEINMETZ.
DISK MILL.
APPLICATION FILED AUG. 26, 1921.
1,429,258.
Patented Sept. 19, 1922.
Fig. 1.
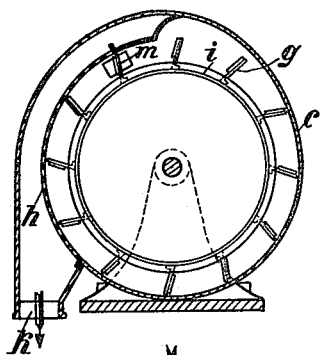
Fig. 2.
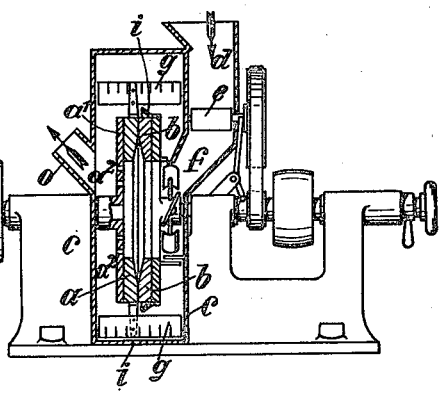
Fig. 3.
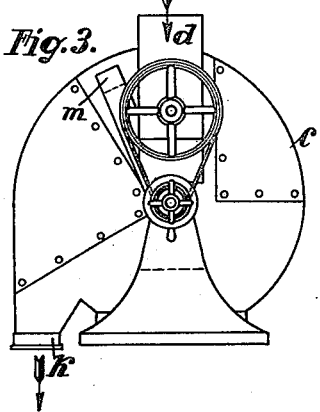
Fig. 5.
Fig. 4.
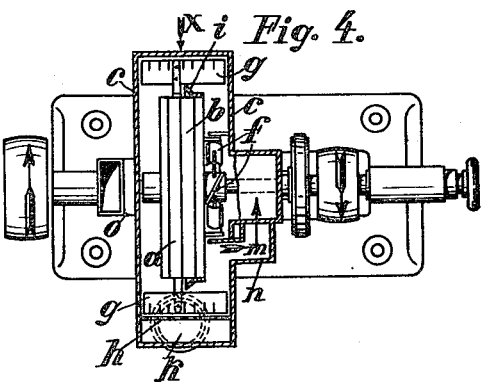
Inventor:
Stefan Steinmetz.
By B. Singer, Atty Patented Sept. 19, 1922.

1,429,258

UNITED STATES PATENT OFFICE.

STEFAN STEINMETZ, OF BERLIN, GERMANY.

DISK MILL.

Application filed August 26, 1921. Serial No. 495,526.

*To all whom it may concern:*

Be it known that I, STEFAN STEINMETZ, a citizen of the German Republic, and a resident of Berlin, Germany, have invented certain new and useful Improvements in Disk Mills, (for which I have obtained a patent in Germany, No. 297,385, dated June 12, 1915), of which the following is a specification.

The grinding device which forms the subject matter of the present invention enables the corn or a previously rough ground portion of the same to be ground down to the finished state without a loss of grist such as cannot be avoided when it is conveyed to the sieves and further grinding machines by means of conveyors such as, for example, elevators, worm conveyors and the like.

For this purpose the disk mill is combined with a sifting device in the following manner. A curved sieve is fitted in the grinding chamber which is suitably enlarged for this purpose and one of the grinding disks, which rotate in opposite directions, carries blades or beaters which throw the product of the grinding disks against the sieve. A further characteristic of the invention is that the grist, i. e., the residue remaining inside the grinding mill, after having passed once through the grinding disks is again returned to the inlet so that said residue can circulate continuously through the inlet and between the grinding surfaces, without leaving the machine, until it is ground down to the finished flour ready for baking.

In order to attain the object desired the grinding disks are suitably provided with two different grinding zones and in such a manner that the one zone has chiefly a cutting action on the grist and the other chiefly a grinding action.

A further feature of the invention consists in the advantageous distribution of the grist over the surface of the sieve by means of a directing ring fixed to one of the grinding disks which gives the grist leaving the grinding surfaces a motion in a direction which is opposed to that in which it is moved by the blades.

Finally in acordance also with the present invention the grinding chamber is suitably cooled in the following manner. In addition to the current of air produced by the beaters arrangements are made whereby a further current of air, which passes in an axial direction through the grinding chamber, can be produced.

With the complete machine, which occupies but little space and requires a correspondingly small amount of power and of which both the initial cost and costs of running and upkeep are also correspondingly small, a flour is produced which makes a bread which is nutritious and easy to bake as it contains all the valuable nourishing constituents of the corn in a completely disintegrated condition.

One construction of a grinding mill in accordance with the present invention is illustrated by way of example in the accompanying drawings in which—

Fig. 1 is a cross section through the mill casing,

Fig. 2 a sectional view through the whole grinding mill,

Fig. 3 a side view of the grinding mill,

Fig. 4 a plan and partly horizontal section through Fig. 2, and finally

Fig. 5 is a plan of one of the blades seen from the direction of the arrow X in Fig. 4.

Referring to the drawings, $a$ and $b$ are the known grinding disks which are arranged in the grinding chamber $c$ and which, also in known manner, receive the grist which is fed in by means of the hopper $d$, the feeding roller $e$ and the distributing blades $f$. The disks $a$ and $b$ can be of any suitable material, for example, stone, artificial stone, steel or other metal or the like.

According to the invention the grinding chamber $c$ is enlarged, preferably in spiral form, so as to enclose the grinding disks but at a certain distance from them. The annular space thus produced contains a number of blades or beaters $g$ and a curved sieve $h$ against which the ground material coming from the grinding surfaces of the disks $a$ and $b$ is driven. The blades or beaters $g$ are fixed to the periphery of one ($a$ in the drawing) of the rotating grinding disks and are suitably of such a length that they extend over both the grinding disks, so that they can coact with a sufficiently wide sieve $h$. These blades or beaters $g$ can be provided with known means, for example they may consist of bent and slit parts (see Fig. 5) or they may be bent in the form of screw-like surfaces, whereby they not only throw the ground product against the sieve $h$, but also give it a motion in a fixed direction parallel to the axis of the grinding disks.

A more complete distribution over the surface of the sieve of the product delivered from the grinding disks can be obtained if the periphery of the second grinding disk $b$ is fitted with a cone-shaped ring $i$ which diverts the ground product towards the left hand side of the blades $g$ while the latter on account of their method of construction as described above carry the product to the right hand side.

The fine portions of the ground product which are driven through the sieve $h$ fall in the direction of the arrow (Fig. 1) through the outlet $k$ while the remainder or residue finds its way back through the opening $m$ (Figs. 1, 3 and 4), which is provided in one of the walls of the grinding chamber, and the channel $n$ to the inlet and thus to the grinding disks $a$ and $b$. The blades $g$ act on the one hand so as to throw the product against the sieve and on the other side of the casing as scoops so as to convey the residue through the opening $m$ into the channel $n$.

The disks $a$ and $b$ advantageously rotate in opposite directions which is in itself known.

Since the grinding mill is to be used chiefly for the production of whole meal and is to produce a larger output precautions must be taken for sufficiently cooling the grinding members in case the current of air produced by the blades alone is not enough. In this case it is advantageous to pass a second current of air entering through the inlet $d$ through the grinding chamber $c$. This may be done by connecting a pipe leading to a fan to the connection $o$. In order that the grinding surfaces may also be effectively ventilated small openings $a^2$ may be provided in the front face $a^1$ of the grinding disk $a$.

Having thus particularly described the nature of my invention, what I claim as new and desire to secure by Letters Patent of the United States is:

1. A disk mill for grinding grain, meal, bran and the like, embodying throw wings on the outer circumference of one of the turning mill disks, said wings being tangentially arranged and extending across both disks, a spirally formed grinding chamber enclosing the wings and provided with a curved sieve, so that the wings lift the ground material leaving the disks and throw it against the sieve.

2. A disk mill for grinding corn, rough ground grain, bran and the like, comprising in combination a spirally formed grinding chamber, oppositely rotating grinding disks, arranged in said grinding chamber, a plurality of blades or beaters tangentially disposed at the outer periphery of one of said grinding disks and extending over both disks, a curved sieve mounted on one side of said spirally formed grinding chamber and adapted to receive the ground products, flung upwardly by said blades or beaters, a lateral opening, arranged in the side wall of the grinding chamber within reach of said blades or beaters and a duct or channel connecting said lateral opening of the grinding chamber to the charging hopper and being adapted to return the residue grist into the latter in order to be ground over again.

3. A disk mill for grinding grain, meal, bran and the like, embodying throw wings on the outer circumference of one of the turning mill disks, said wings being tangentially arranged and extending across both disks, a spirally formed grinding chamber enclosing the wings and provided with a curved sieve, so that the wings lift the ground material leaving the disks and throw it against the sieve, said grinding chamber having a side opening in its side wall within throwing reach of the wings, and a channel for the return of the residue to the inlet hopper.

4. A disk mill for grinding grain, meal, bran and the like, embodying throw wings on the outer circumference of one of the turning mill disks, said wings being tangentially arranged and extending across both disks, a spirally formed grinding chamber enclosing the wings and provided with a curved sieve, so that the wings lift the ground material leaving the disks and throw it against the sieve, one of the grinding disks having a conical ring on its circumference to retain the ground product on one side of the grinding chamber, said throw wings transferring such product to the opposite side.

5. A disk mill for grinding grain, meal, bran and the like, embodying throw wings on the outer circumference of one of the turning mill disks, said wings being tangentially arranged and extending across both disks, a spirally formed grinding chamber enclosing the wings and provided with a curved sieve, so that the wings lift the ground material leaving the disks and throw it against the sieve, and means for forcing fresh air through said mill.

In testimony whereof I affix my signature in presence of two witnesses.

STEFAN STEINMETZ.

Witnesses:
OTTO F. BRUNN,
PAUL BRABAND.